(12) United States Patent
Kadoch (10) Patent No.: US 10,512,366 B1
(45) Date of Patent: Dec. 24, 2019

(54) MULTIPLE FOOD INGREDIENT DISPENSING DEVICE

(71) Applicant: Mayer Kadoch, Brooklyn, NY (US)

(72) Inventor: Mayer Kadoch, Brooklyn, NY (US)

( * ) Notice: Subject to any disclaimer, the term of this patent is extended or adjusted under 35 U.S.C. 154(b) by 0 days.

(21) Appl. No.: 15/987,066

(22) Filed: May 23, 2018

(51) Int. Cl.
*A47J 47/01* (2006.01)
*G01F 11/28* (2006.01)
*G01F 15/00* (2006.01)

(52) U.S. Cl.
CPC .............. *A47J 47/01* (2013.01); *G01F 11/282* (2013.01); *G01F 15/001* (2013.01)

(58) Field of Classification Search
CPC ....... A47J 47/01; G01F 11/282; G01F 15/001
See application file for complete search history.

(56) References Cited

U.S. PATENT DOCUMENTS

| | | | | |
|---|---|---|---|---|
| 607,716 | A * | 7/1898 | Stevenson .......... | B65G 65/4836 222/240 |
| 618,219 | A * | 1/1899 | Bell .................... | B01F 13/1058 222/144 |
| 644,257 | A * | 2/1900 | Nulloy .................. | B65D 88/68 222/144 |
| 1,424,682 | A * | 8/1922 | Schlosser ............... | A47J 47/01 222/144 |
| 2,302,186 | A | 6/1939 | Caretto | |
| 2,354,004 | A | 7/1944 | Fess | |
| 2,526,308 | A | 10/1950 | Vorsanger | |
| 2,890,816 | A | 6/1959 | Horland | |
| 3,498,136 | A | 3/1970 | Le May | |
| 7,083,070 | B2 * | 8/2006 | McGuyer ............... | A47G 23/08 211/77 |
| 9,469,463 | B2 * | 10/2016 | Murray .............. | B65D 85/8043 |
| 9,591,943 | B2 * | 3/2017 | Murray .................. | A47J 31/404 |
| 2007/0181600 | A1 | 8/2007 | Ben-Shlomo et al. | |
| 2012/0104037 | A1 * | 5/2012 | Ben-Shoshan ......... | A47G 19/18 222/1 |
| 2014/0183221 | A1 * | 7/2014 | Perkins ................... | A47J 47/01 222/81 |

* cited by examiner

*Primary Examiner* — Frederick C Nicolas
(74) *Attorney, Agent, or Firm* — Cramer Patent & Design, PLLC; Aaron R. Cramer (57) ABSTRACT

Multiple food ingredient dispensing device that include a body having a dispensing opening and an internal orifice plate that supports a release mechanism. The device either includes a carousel unit on a central axle or a carrier that turns on a bearing. The carousel unit or carrier hold a plurality of ingredient pods that contain food ingredients, and which rotate relative to the body. Rotating the ingredient pods can cause a selected one to rotate over the release mechanism. The release mechanism can then cause a controlled volume of the food ingredient to fall from associated ingredient pod. Also included are a viewing window with measurement indicia and a measurement adjust knob that adjusts the amount that falls when the release mechanism is opened. A dispensing opening then allows the food ingredient to fall out of the dispensing device.

15 Claims, 6 Drawing Sheets

MULTIPLE FOOD INGREDIENT DISPENSING DEVICE

RELATED APPLICATIONS

Not applicable.

FIELD OF THE INVENTION

The presently disclosed subject matter is directed to kitchen implements. More particularly, it is directed to a multiple food ingredient dispensing device.

BACKGROUND OF THE INVENTION

For thousands of years cooking has been one of mankind's most important activities. Cooking is done in the home, in schools and hospitals, in military installations and aboard ships, in parks, while traveling and just about everywhere a person may be. Cooking can be performed as a basic requirement for survival, for the pure enjoyment of turning basic foodstuffs into delectable treats, and as a profession.

Cooking at its basic is the process of preparing raw foodstuffs for consumption by the application of heat. Usually the goal is something that is not only digestible but also at least somewhat pleasurable to consume. Different cultures use many different foodstuffs to prepare the native cuisines. A rather sad fact is that most basic foodstuffs are by themselves not particularly palatable. Compounding that problem is that eating the same basic foodstuff day after day can be monotonous.

However, in addition to the basic foodstuffs mankind has available a very wide range of food ingredients that can enhance the flavor of basic foodstuffs. Salt, pepper, cumin, anise seeds, ajwain, bay leaf, cardamom, mustard, ground peppers of very numerous types, cinnamon, ginger, garlic, poppy seeds, sesame seeds, turmeric, and curry as just a very small sampling of the different cooking food ingredients available to cooks around the world.

A major problem faced daily by cooks everywhere is keeping their different food ingredients readily available. Another major problem is measuring out the different food ingredients while cooking.

Various approaches have been taken in the prior art to address those and other problems with food ingredients. Spice shelves and spice racks are common. Various measuring cups, spoons and other utensils are readily available and widely used. But cooks still clamor for better ways of keeping food ingredients at hand and in measuring out the desired amounts of their selected food ingredients.

Accordingly, there exists a need for a device which keep desired food ingredients readily at hand. Beneficially such a device would be able to measure out the desired amount of selected food ingredients. Preferably such a device would be easy to use, would not take up much space, would assist in actually adding the desired amount of selected food ingredients to the utensil being used to cook, and would be suitable for being made available at relatively low cost.

SUMMARY OF THE INVENTION

The principles of the present invention provide for multiple food ingredient dispensing a device that keeps a number of desired food ingredients readily at hand. Such a multiple food ingredient dispensing device can measure out the desired amount of selected food ingredients and can assist in adding the desired amount of a selected food ingredient to the item being cooked. The multiple food ingredient dispensing device is easy to use, does not take up much space, and is suitable for being made available at relatively low cost.

A multiple food ingredient dispensing device that is in accord with the present invention includes a body having a dispensing opening and an internal orifice plate that supports a release mechanism. It also includes a carousel unit that is held by the body and a rotating holding assembly disposed on the carousel unit. The rotating holding assembly has at least a first bay and a second bay for respectively holding a first ingredient pod and a second ingredient pod. The rotating holding assembly turns on a central axle. The central axle enables the rotating holding assembly to selectively rotate the first bay over the release mechanism.

The multiple food ingredient dispensing device may further including a first ingredient pod holding a first ingredient in the first bay. If so, a description label can be placed on the first ingredient pod. Preferably the first food ingredient is a dry ingredient and the first ingredient pod is removable. In practice the ingredient pod has a lower opening that enables at least some of the first ingredient to fall out of its associated ingredient pod when the release mechanism is opened.

The body should include a measure/release actuator, a measuring chamber having a viewing window with measurement indicia, and a measurement adjust knob. The measurement adjustment knob can be used to adjust the amount of the first food ingredient that falls from the first ingredient pod when the release mechanism is opened. The measurement indicia enable a user to visual determine the amount of the first food ingredient to fall from the first ingredient pod. In practice the volume of the measuring chamber can be varied by the measurement adjustment knob. Preferably there is a sealed track along the body through which the measurement adjustment knob slides.

Beneficially a first activation of the measure/release actuator causes the release mechanism to open, while a second activation causes the first food ingredient to fall from the dispensing opening. A transfer tube and a measuring chamber can receive the first food ingredient from the release mechanism. An indicia arrow on the body can be used to identify the position to rotate the first bay to such that it is over the release mechanism.

Another multiple food ingredient dispensing device that is in accord with the principles of the present invention includes a body having a dispensing opening, an internal orifice plate that supports a release mechanism, and a top race. A rotating carrier assembly has a bearing that is disposed in the race. The carrier assembly includes a first bay and a second bay for respectively holding a first ingredient pod and a second ingredient pod. A release mechanism selectively releases a food ingredient through the orifice plate when the carrier assembly is rotated into position over the orifice plate. In practice the bearing is circumferential, the first ingredient pod holds a first ingredient in the first bay, and there is a description label on the first ingredient pod. In practice the first ingredient pod is removable.

BRIEF DESCRIPTION OF THE DRAWINGS

The advantages and features of the present invention will become better understood with reference to the following detailed description and claims when taken in conjunction with the accompanying drawings in which like elements are identified with like symbols and in which:

DESCRIPTIVE KEY 10 first embodiment multiple food ingredient dispensing device
11 second embodiment multiple food ingredient dispensing device
12 body
15 carousel unit
16 race
20 rotating holding assembly
21 carrier
22 bearing
25 central axle
30 ingredient pod
31 bay
35 description label
40 food ingredient
45 rotational travel path "r"
50 indicia arrow
55 removal travel path "t"
60 lower opening
65 measure/release actuator
70 viewing window
75 measurement indicia
80 measurement adjustment knob
85 dispensing opening
90 orifice plate
95 mechanical release mechanism
100 transfer tube
105 measuring chamber
110 movable folding release plunger
115 sealed track
120 first activation linkage
125 second activation linkage
130 third activation linkage
135 active position
140 slide gauge mechanism
145 spring return mechanism
150 latching mechanism
155 outer seal

DETAILED DESCRIPTION OF THE PREFERRED EMBODIMENT

Preferred embodiments of the present invention are depicted in FIGS. 1 through 7. However, the invention is not limited to the specifically described embodiment. A person skilled in the art will appreciate that many other embodiments of the invention are possible without deviating from the basic concept of the invention. Any such work around will also fall under the scope of this invention.

The terms "a" and "an" as used herein do not denote a limitation of quantity, but rather denote the presence of at least one of the referenced items.

Figure 1:
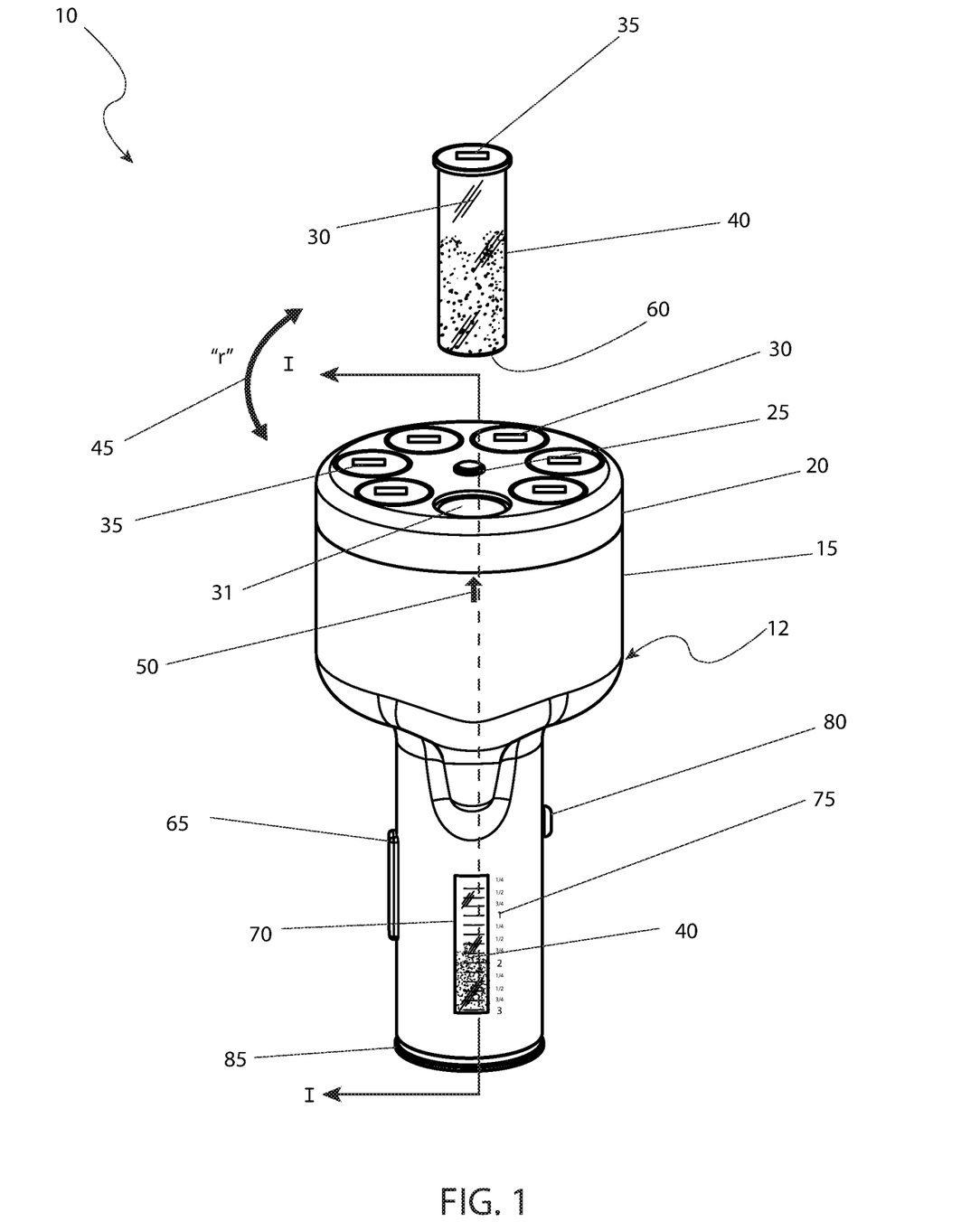
FIG. 1 is a perspective view of a first embodiment multiple food ingredient dispensing device 10 that is in accord with the present invention.
Figure 2:
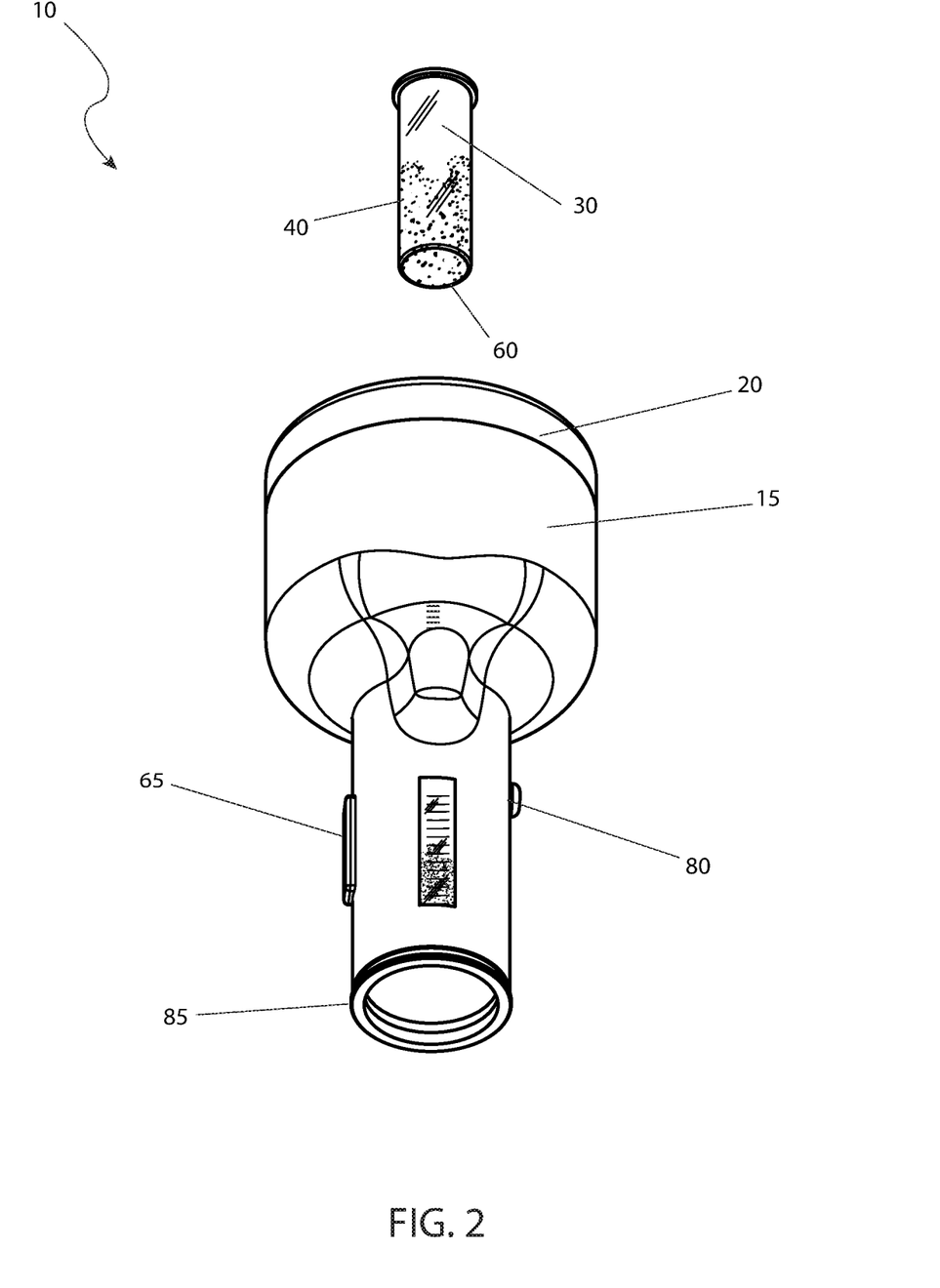
FIG. 2 Illustrates a bottom perspective view of the first embodiment multiple food ingredient dispensing device 10 shown in FIG. 1.

The present invention relates to multiple food ingredient dispensing device. Refer now to FIG. 1 for a perspective view of a first embodiment multiple food ingredient dispensing device 10 that is in accord with the principles of the present invention. The multiple food ingredient dispensing device 10 includes a body 12 holding a carousel unit 15 and a rotating holding assembly 20 that is disposed above the carousel unit 15. The rotating holding assembly 20 rotates relative to the carousel unit 15 on a central axle 25.

The multiple food ingredient dispensing device 10 holds seven ingredient pods 30, each of which is inserted into an associated bay 31 of the rotating holding assembly 20. Beneficially each ingredient pod 30 holds a food ingredient 40 which is described on a description label 35. The food ingredients 40 are envisioned to include but are not limited to dry ingredients such as turmeric, paprika, parsley, salt, garlic powder, pepper, cumin, or the like.

The ingredient pods 30 are removable from their respective bays 31 along removal travel paths "t" 55. Removal of an ingredient pod 30 enables refilling or replacement. It is envisioned that the ingredient pods 30 may be replaced with a new ingredient pod 30 or that the ingredient pod 30 may be refilled from a bulk container.

Figure 3:
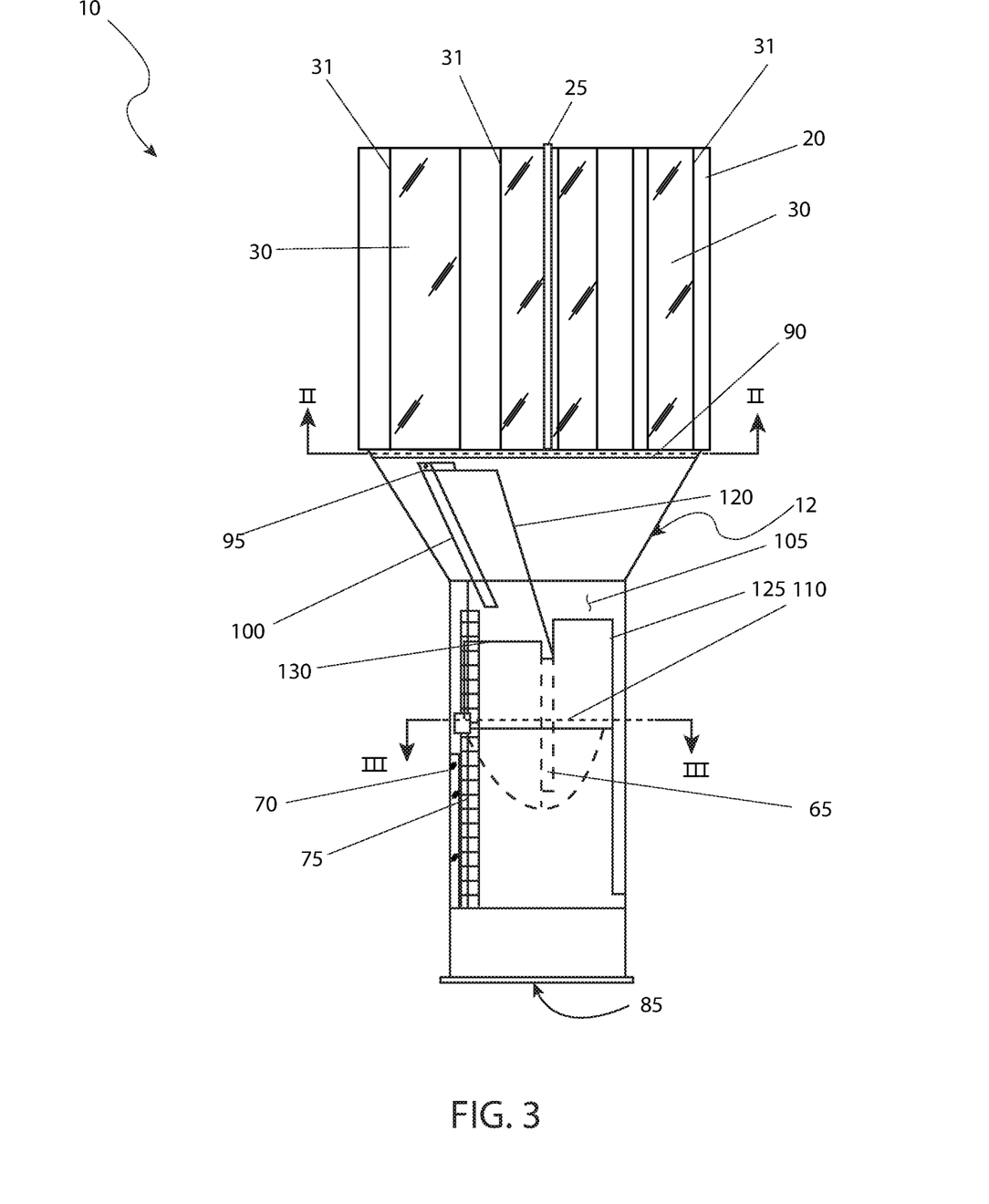
FIG. 3 is a sectional view of the first embodiment multiple food ingredient dispensing device 10 taken along line I-I of FIG. 1.

Refer now to FIG. 3 for a sectional view of the first embodiment multiple food ingredient dispensing device 10 taken along section line I-I of FIG. 1. The various ingredient pods 30 are supported within their respective bays 31 by an orifice plate 90 that supports a mechanical release mechanism 95. A desired food ingredient 40 is selected for dispensing by rotating the rotating holding assembly 20 relative to the carousel unit 15 along rotational travel path "r" 45 until the ingredient pod 30 holding the desired food ingredient 40 is properly positioned relative to an indicia arrow 50. When aligned with the indicia arrow 50 the ingredient pod 30 holding the desired food ingredient 40 is also aligned with the mechanical release mechanism 95.

Each ingredient pod 30 has a lower opening 60 that enables the retained food ingredient 40 to fall from its associated ingredient pod 30. To assist controlled removal of the food ingredient 40 from an ingredient pod 30 the multiple food ingredient dispensing device 10 includes a measure/release actuator 65, a viewing window 70 having measurement indicia 75, and a measurement adjust knob 80. The measurement adjustment knob 80 enables a user to adjust the amount of the desired food ingredient 40 to be dispensed, while the measurement indicia 75 enables the user to visual confirm the amount of the selected food ingredient 40 to be dispensed.

When the mechanical release mechanism 95 is opened (described in more detail below) the desired food ingredient 40 falls into a transfer tube 100 which transports the desired food ingredient 40 into a measuring chamber 105. Upon first activation of the measure/release actuator 65 the mechanical release mechanism 95 is opened and the food ingredient 40 in the selected ingredient pod 30 is released at the volume set by the measurement adjustment knob 80. A subsequent activation of the measure/release actuator 65 releases the measured food ingredient 40 from the first embodiment multiple food ingredient dispensing device 10 via a dispensing opening 85.

It is envisioned that the maximum held amount of a retained food ingredient 40 could vary in accord with the overall size of the first embodiment multiple food ingredient dispensing device 10. A nominally sized first embodiment multiple food ingredient dispensing device 10 might be seven to nine inches (7-9 in.) tall and have a carousel unit 15 diameter of approximately four inches (4 in.). Such a first embodiment multiple food ingredient dispensing device 10 might enable dispensing volumes ranging from one-half teaspoon up to three tablespoons (½ t-3 T). However, it should be understood that neither the size, the ingredient measuring capability, nor the units of measure is intended to be a limiting factor of the present invention.

It is further envisioned that major components of the first embodiment multiple food ingredient dispensing device 10 would be made of plastic using an injection molding process. Such a plastic should be food grade and suitable for cleaning, washing, and drying by hand or machine. Other resilient materials, specifically including a range of stainless steels may be highly advantageous.

The operating volume of the measuring chamber 105 can be varied by a movable folding release plunger 110. The position of the movable folding release plunger 110 is controlled by the measurement adjustment knob 80 which slides along a sealed track 115. The position of the movable folding release plunger 110 can be seen through the viewing window 70 and its operating volume can be determined by the measurement indicia 75. The movable folding release plunger 110 is beneficially bifurcated and folds in its middle to provide greater adjustability.

Still referring to FIG. 3, the measure/release actuator 65 (in dashed lines as it is located on an unshown surface of the first embodiment multiple food ingredient dispensing device 10) is connected to a first activation linkage 120 which opens and closes the mechanical release mechanism 95. The measure/release actuator 65 is also connected to both a second activation linkage 125 and to a third activation linkage 130 which open and close the movable folding release plunger 110.

The measure/release actuator 65 implements a mechanical pattern that operates in the following manner: a first press opens the mechanical release mechanism 95 while the movable folding release plunger 110 remains closed; a second press closes the mechanical release mechanism 95 and opens the movable folding release plunger 110 via the second and third activation linkages 125, 130. Those patterns operate cyclically, opening and closing the mechanical release mechanism 95 and the movable folding release plunger 110. However, the mechanical release mechanism 95 and the movable folding release plunger 110 are not opened or closed simultaneously. When the movable folding release plunger 110 is opened the measured food ingredient 40 discharges via gravity through the dispensing opening 85. The multiple food ingredient dispensing device 10 is preferably configured to stand upright on a counter-top or similar surface.

Figure 4:
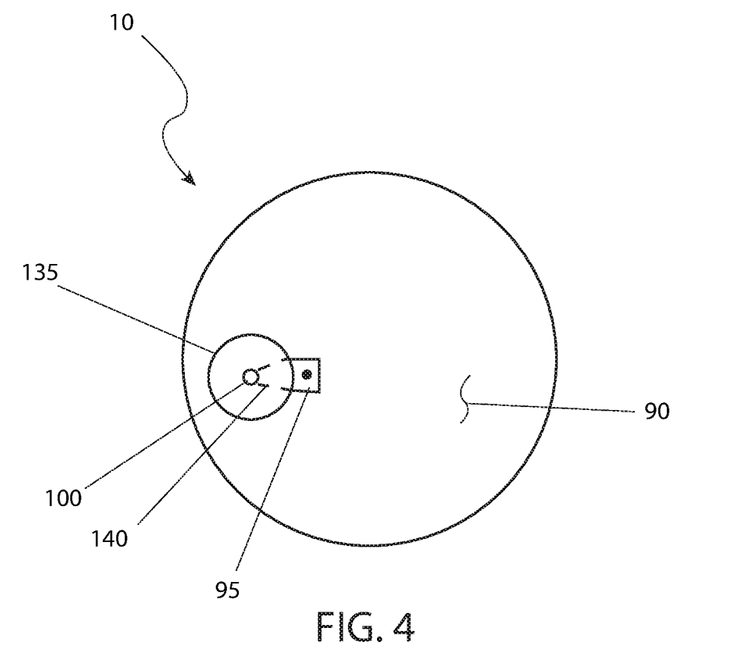
FIG. 4 is a sectional view of the first embodiment multiple food ingredient dispensing device 10 taken along line II-II of FIG. 3.

Referring now to FIG. 4, a sectional view of the first embodiment multiple food ingredient dispensing device 10 taken along line II-II of FIG. 3, the orifice plate 90 closes all ingredient pods 30 except for the one in the active position 135 which is identified by the indicia arrow 50 (see FIG. 1). The transfer tube 100 is centered in the active position 135. A slide gauge mechanism 140 operated by the mechanical release mechanism 95 enables the food ingredient 40 to leave the active ingredient pod 30 by gravity (as shown in FIG. 1).

Figure 5:
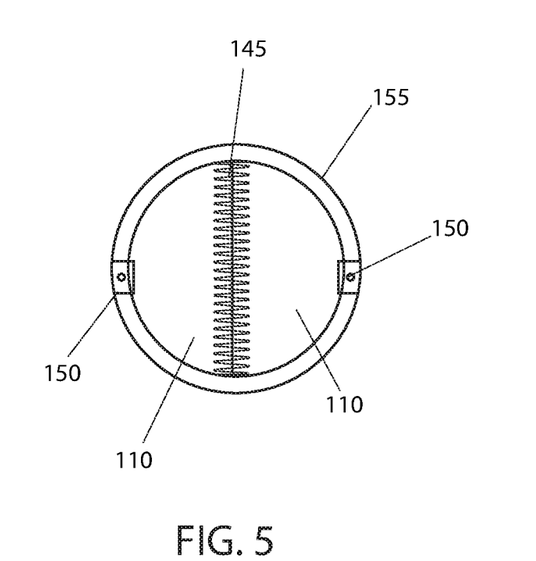
FIG. 5 is a sectional view of the firsts embodiment multiple food ingredient dispensing device 10 taken along line III-III of FIG. 3.

Referring now to FIG. 5, a sectional view taken along line III-III of FIG. 3, the movable folding release plunger 110 is connected to a centrally located spring return mechanism 145. The arms of the movable folding release plunger 110 open to allow the selected food ingredient 40 to discharge, but after discharge the arms close. Two (2) latching mechanisms 150 are activated by the second activation linkage 125 (see FIG. 3) and by the third activation linkage 130 (again, see FIG. 3) to hold the movable folding release plunger 110 closed during ingredient measurement. An outer seal 155, envisioned to be rubber, neoprene or the like, allows the assembly comprising the movable folding release plunger 110, the spring return mechanism 145, and the latching mechanisms 150 to ride inside the measuring chamber 105 (see FIG. 3).

Figure 6:
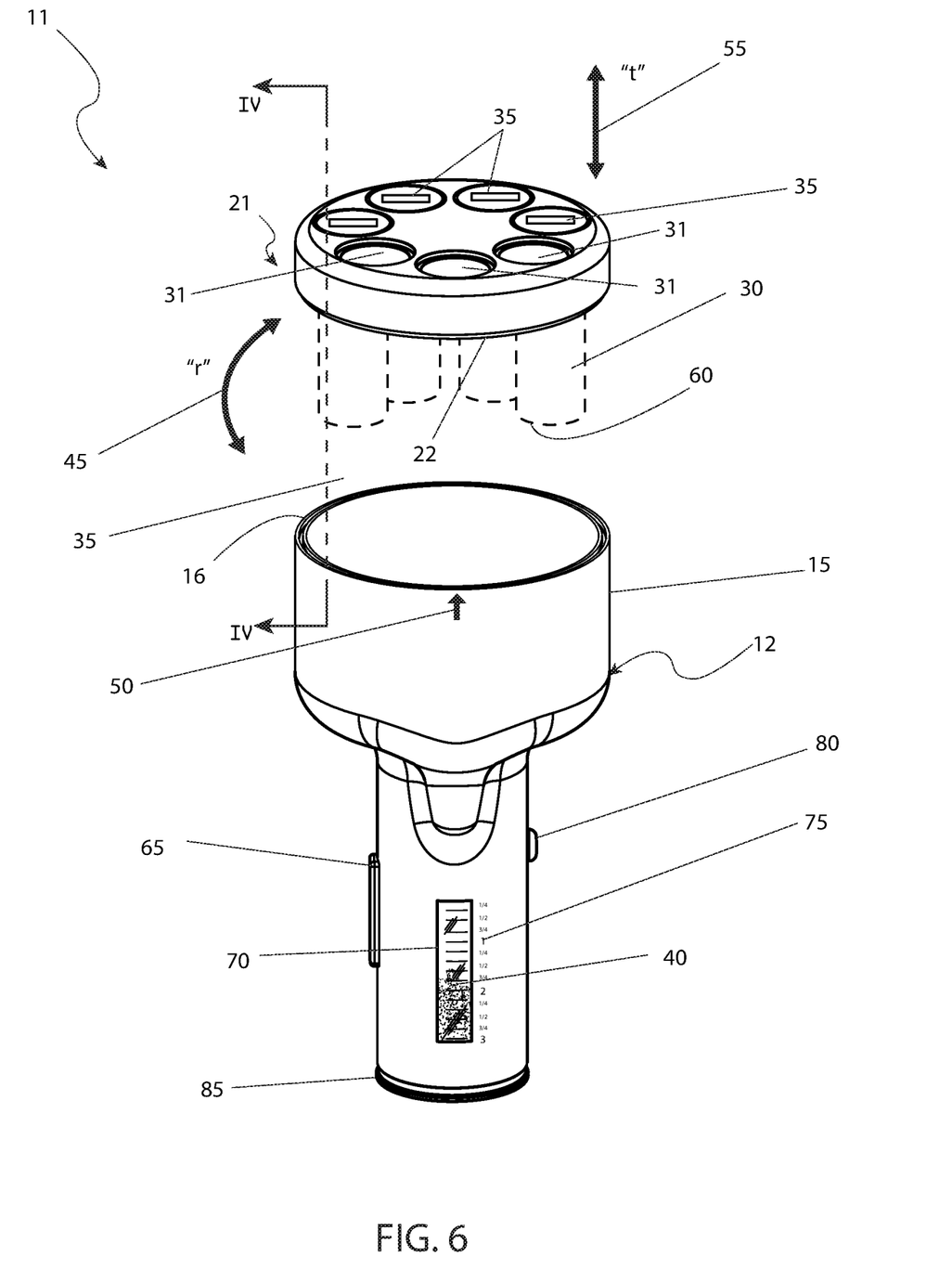
FIG. 6 is a perspective view of a second embodiment multiple food ingredient dispensing device 11 that is in accord with the present invention; and, FIG. 7 is a sectional view of the multiple food ingredient dispensing device 10 taken along line IV-IV of FIG. 1.
Figure 7:
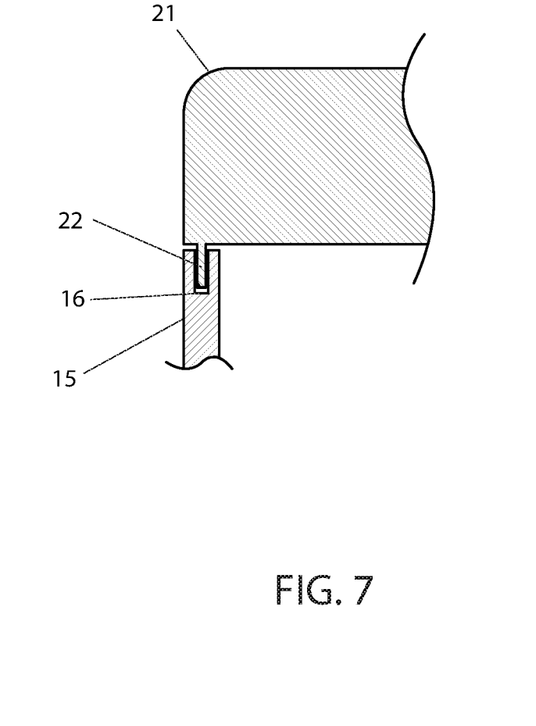

FIG. 6 illustrates a second embodiment multiple food ingredient dispensing device 11 of the invention which uses a carrier 21 in place of the rotating holding assembly 20. The carrier 21 includes a plurality of bays 31 which hold ingredient pods 30. Instead of a central axle 25 as used in the first embodiment the carrier 21 uses a circumferential bearing 22 that rides in a matching internal race 16 of the body 12. The carrier 21 can then rotate with respect to the body 12 in the same manner as the rotating holding assembly 20.

The bearing 22 and race 16 form a tight fit, yet one that can be rotated. Thus, the bearing 22 and race 16 are comprised of close fitting, low coefficient of friction materials. That is, the carrier 21 should readily rotate in the race 16 yet the material inside the body 12 cannot pass through the fit between the bearing 22 and the race 16. A latching mechanism (not shown) may be employed to securely fix the carrier 21 to the body 12 or to fix a specific pod 30 over the mechanical release mechanism 95.

The remainder of the multiple food ingredient dispensing device 11 is the same as with the multiple food ingredient dispensing device 10. The carrier 21 holds a plurality of ingredient pods 30 that each retain a food ingredient 40 in associated bays 31. Description labels 35 identify the contents of each ingredient pod 30. Preferably the food ingredient 40 is a dry ingredient which can be replenished after removing an ingredient pod 30.

The preferred embodiments of the present invention can be used by a common user in a simple and effortless manner with little or no training. After initial purchase or acquisition of a multiple food ingredient dispensing device 10, 11 it would be cleaned, washed, rinsed, and air dried to remove any contaminants and remaining manufacturing by products. The ingredient pods 30 would be filled with the user's desired food ingredient 40 and inserted into their respective bays 31; the desired food ingredient 40 would then be indexed via rotation along the indicia arrow 50. The desired amount of the desired food ingredient 40 would be selected via use of the measurement adjustment knob 80 and verified by using the viewing window 70 and the measurement indicia 75. The measure/release actuator 65 then would be pressed once to close/lock the movable folding release plunger 110 and to open the mechanical release mechanism 95 and slide gauge mechanism 140; the multiple food ingredient dispensing device 10, 11 would then be positioned over a cooking pan, baking pan, mixing bowl, or similar receptacle; the measure/release actuator 65 would be pressed to open/unlock the movable folding release plunger 110 while closing the mechanical release mechanism 95 and slide gauge mechanism 140, thereby allowing the desired food ingredient 40 to exit the multiple food ingredient dispensing device 10 via gravity. Such processes would then be repeated for additional selected food ingredients 40 as required. These aforementioned steps are capable of working either with the rotating holding assembly embodiment 20 or with the removable carrier embodiment 21.

After use of the multiple food ingredient dispensing device 10, 11 may then be replenished with various food ingredients 40 as required via replacement of the ingredient pods 30, via refilling of the ingredient pods 30 and/or via replacement of the carrier 21 containing the pods 30 with a new carrier 21 containing pre-filled pods 30.

The foregoing descriptions of specific embodiments of the present invention have been presented for purposes of illustration and description. They are not intended to be exhaustive or to limit the invention to the precise forms disclosed. Obviously, many modifications and variations are possible in light of the above teaching. The embodiment was chosen and described in order to best explain the principles of the invention and its practical application, to thereby enable others skilled in the art to best utilize the invention and various embodiments with various modifications as are suited to the particular use contemplated.

The invention claimed is:

1. A multiple food ingredient dispensing device, comprising:
    a body having a dispensing opening and an internal orifice plate that supports a release mechanism;
    a carousel unit held by said body;
    a rotating holding assembly disposed on said carousel unit, said rotating holding assembly having a first bay and a second bay for respectively holding a first ingredient pod and a second ingredient pod; and
    a central axle connecting said rotating holding assembly to said body, a central angle for enabling rotation of said rotating holding assembly to selectively locate said first bay over said release mechanism.

2. The multiple food ingredient dispensing device according to claim 1, further including said first ingredient pod holding a first ingredient in said first bay.

3. The multiple food ingredient dispensing device according to claim 2, further including a description label on said first ingredient pod.

4. The multiple food ingredient dispensing device according to claim 2, wherein a first food ingredient is a dry ingredient.

5. The multiple food ingredient dispensing device according to claim 2, wherein said first ingredient pod is removable.

6. The multiple food ingredient dispensing device according to claim 2, wherein said first ingredient pod has a lower opening that enables at least some of said first ingredient to fall out of said first ingredient pod when said release mechanism is opened.

7. The multiple food ingredient dispensing device according to claim 6, wherein said body includes a measure/release actuator, a measuring chamber having a viewing window with measurement indicia, and a measurement adjust knob.

8. The multiple food ingredient dispensing device according to claim 7, wherein a measurement adjustment knob adjusts an amount of said first food ingredient that falls from said first ingredient pod when said release mechanism is opened.

9. The multiple food ingredient dispensing device according to claim 8, wherein said measurement indicia enables a user to visual determine the amount of said first food ingredient to fall from said first ingredient pod.

10. The multiple food ingredient dispensing device according to claim 9, wherein the volume of said measuring chamber can be varied by said measurement adjustment knob.

11. The multiple food ingredient dispensing device according to claim 10, further including a sealed track along said body through which said measurement adjustment knob slides.

12. The multiple food ingredient dispensing device according to claim 9, wherein a first activation of said measure/release actuator causes said release mechanism to open.

13. The multiple food ingredient dispensing device according to claim 12, wherein a second activation of said measure/release actuator causes said first food ingredient to fall from said dispensing opening.

14. The multiple food ingredient dispensing device according to claim 13, wherein when said body further retains a transfer tube and a measuring chamber for receiving said first food ingredient from said release mechanism.

15. The multiple food ingredient dispensing device according to claim 1, further including an indicia arrow on said body that identifies a position to rotate said first bay to such that said first bay is over said release mechanism.

* * * * *